(12) United States Patent
Hirsch

(10) Patent No.: US 6,415,086 B1
(45) Date of Patent: Jul. 2, 2002

(54) BUNDLED MONOCAPILLARY OPTICS

(76) Inventor: Gregory Hirsch, 1277 Linds Mar Center, Suite 128, Pacifica, CA (US) 94044

(*) Notice: Subject to any disclaimer, the term of this patent is extended or adjusted under 35 U.S.C. 154(b) by 0 days.

(21) Appl. No.: 09/503,776

(22) Filed: Feb. 14, 2000

Related U.S. Application Data

(60) Provisional application No. 60/120,118, filed on Feb. 16, 1999.

(51) Int. Cl.$^7$ .................................................. G02B 6/06
(52) U.S. Cl. ........................ 385/116; 385/147; 359/900
(58) Field of Search ................................. 385/115, 116, 385/147; 359/900

(56) References Cited

U.S. PATENT DOCUMENTS 5,009,475 A * 4/1991 Knudson

* cited by examiner

*Primary Examiner*—Hung N. Ngo
(74) *Attorney, Agent, or Firm*—William Michael Hynes; Townsend and Townsend and Crew LLP

(57) ABSTRACT

A plurality of glass or metal wires are precisely etched to form the desired shape of the individual channels of the final polycapillary optic. This shape is created by carefully controlling the withdrawal speed of a group of wires from an etchant bath. The etched wires undergo a subsequent operation to create an extremely smooth surface. This surface is coated with a layer of material which is selected to maximize the reflectivity of the radiation being used. This reflective surface may be a single layer of material, or a multilayer coating for optimizing the reflectivity in a narrower wavelength interval. The collection of individual wires is assembled into a close-packed multi-wire bundle, and the wires are bonded together in a manner which preserves the close-pack configuration, irrespective of the local wire diameter. The initial wires are then removed by either a chemical etching procedure or mechanical force. In the case of chemical etching, the bundle is generally segmented by cutting a series of etching slots. Prior to removing the wire, the capillary array is typically bonded to a support substrate. The result of the process is a bundle of precisely oriented radiation-reflecting hollow channels. The capillary optic is used for efficiently collecting and redirecting the radiation from a source of radiation which could be the anode of an x-ray tube, a plasma source, the fluorescent radiation from an electron microprobe, a synchrotron radiation source, a reactor or spallation source of neutrons, or some other source.

19 Claims, 9 Drawing Sheets

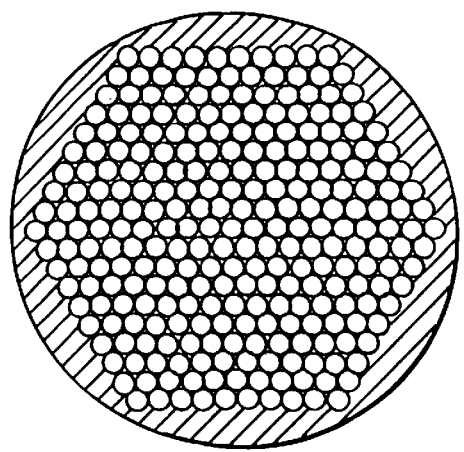
G and G' Hole Pattern
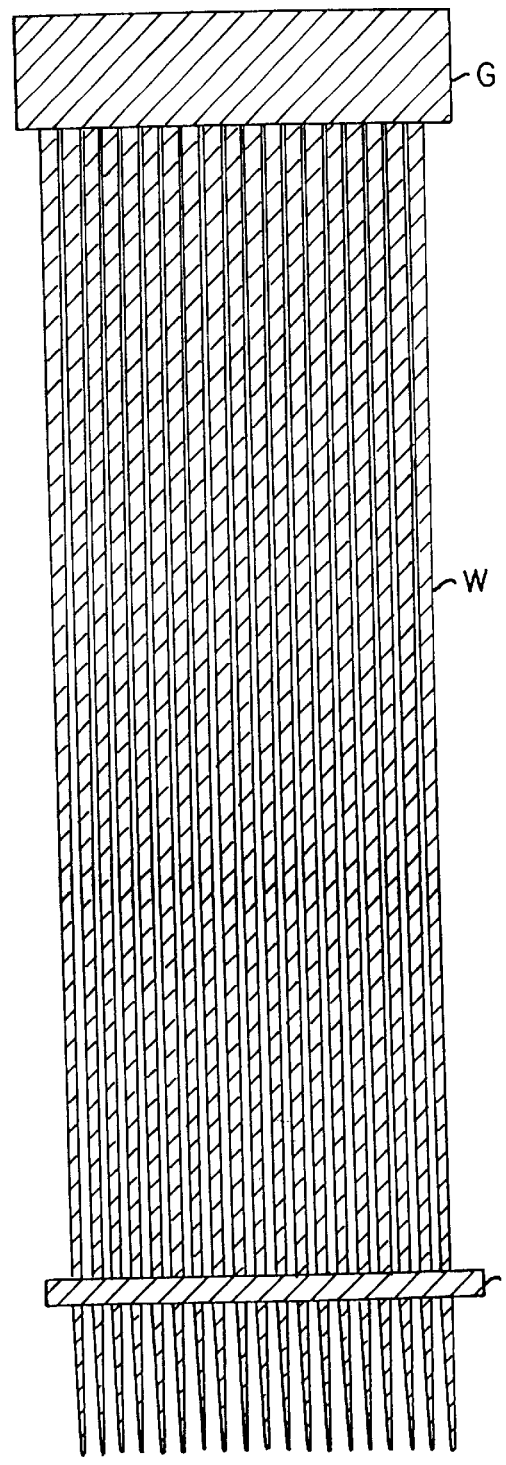
FIG. 2.
G"-Alternate Hole Pattern
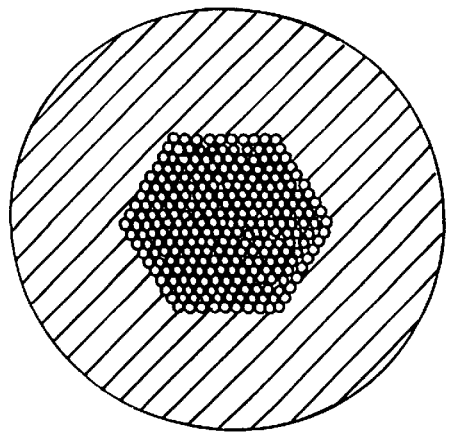

BUNDLED MONOCAPILLARY OPTICS

CROSS-REFERENCES TO RELATED APPLICATIONS

This application claims the benefit of U.S. Provisional Patent Application Serial No. 60/120,118, filed Feb. 16, 1999, the disclosure of which is incorporated by reference.

STATEMENT AS TO RIGHTS TO INVENTIONS MADE UNDER FEDERALLY SPONSORED RESEARCH AND DEVELOPMENT

This invention was made with Government support under Grant No. DE-FG0396ER82185 awarded by the Department of Energy. The Government has certain rights in this invention.

This invention relates to the use of optics to produce a directed beam of radiation by grazing-incidence reflection. More particularly, an optical element is disclosed which is produced by assembling a collection of separate tapered-monocapillary optical elements to form a polycapillary optic. The individual monocapillary channels are created in a batch process which allows for the optimization of the shape, smoothness, and material choice of the radiation-reflecting interior surfaces. The resultant optics can be used to produce either a collimated beam or a focused spot of photons, neutrons, or charged particles. In the case of photons, the use of x-rays is the most important application.

BACKGROUND OF THE INVENTION

In recent years, there have been dramatic developments in the field of x-ray optics. Many different types of optical elements have been introduced or improved for the manipulation of short wavelength photons. In the specific area of focusing optics, several different types of lenses and focusing mirrors have been produced. These optics. include: zone plates, Bragg-Fresnel zone plates, multilayer focusing mirrors, grazing incidence mirrors, compound refractive lenses, and capillary optics. In addition to photons, some of these optical elements can be used for the focusing of neutrons and charged particle beams.

The introduction of x-ray analysis has been one of the most significant developments in twentieth-century science and technology. The use of x-ray diffraction, spectroscopy, imaging, and other techniques has led to a profound increase in our knowledge in virtually all scientific fields. The capabilities of x-ray analysis have expanded consistently with the availability of ever more powerful sources of radiation. The standard x-ray tube has seen a relatively gradual increase in performance over many decades. Notable improvements in x-ray tube technology include the introduction of rotating anode sources and microfocus tubes. The advent of synchrotron radiation sources over the past few decades has led to a true revolution in x-ray science. Although the use of synchrotron radiation has become an extremely important research tool, the need to travel to large and extremely expensive central facilities to perform experiments during a limited time interval is a distinct disadvantage. Thus, the vast majority of work is still performed using x-ray tubes.

Many experiments are now performed using rotating anode sources which have significantly higher power capabilities than stationary anode tubes. These sources are quite expensive and can consume over ten kilowatts of input power. Recently, with the introduction of improved x-ray focusing optics, the ability to use small, low power microfocus x-ray sources to achieve x-ray beam intensities comparable to that achieved with rotating anode tubes has been demonstrated. It has been shown that a microfocus source running at a few tens of watts input-power, in conjunction with focusing optics, can produce beams with a brightness comparable to a multi-kilowatt rotating anode source. Such combined small sources and collection optics will greatly expand the capabilities of x-ray analysis equipment in small laboratories. The optimization of x-ray optics for these applications is of crucial importance for realizing the potential of these laboratory instruments.

In addition to sources of x-rays, there has been a significant increase in the capabilities of neutron sources, many of which exist as user facilities in a manner similar to synchrotron radiation sources. Both reactor and spallation sources have been built with ever increasing neutron fluxes. For certain applications such as prompt-gamma activation analysis and neutron depth profiling, it would be very desirable to produce a focused beam of thermal or cold neutrons. The use of small beams is also advantageous for neutron diffraction applications, although the increased divergence of the focused beam can be detrimental in some cases. There have been some advances in neutron focusing optics over the past few years. Improvements to these optics will have a large impact on the capabilities of these neutron facilities.

PRIOR ART

Although there exist x-ray optics which utilize diffraction and refraction for their operation, we are concerned with reflective optics in this invention. It is well known that x-rays incident on a surface at sufficiently small angles of incidence will be reflected by total external reflection. The largest angle of incidence for reflection (critical angle) is determined by the refractive index of the material:

$$n = 1 - \delta - i\beta$$

Using Snell's Law, we can derive this angle as:

$$\theta_c = (2\delta)^{1/2} \text{(assuming } \beta = 0\text{)}$$

The theoretical value for $\delta$ is:

$$\delta = \frac{1}{2}(e^2/mc^2)(N_{op}/A)Z\lambda^2 = 2.70 \times 10^{10}(Z/A)\rho\lambda^2$$

The angles are quite small since the refractive index for x-rays is very close to unity for all materials. For example, the critical angle for borosilicate glass at $\lambda = 1\text{Å}$ is less than 3 milliradians. For achieving the highest critical angles, high density materials such as gold or platinum are desirable.

In the case of neutrons, grazing incidence reflection can also be used for producing optical devices. The critical angle for reflection of neutrons is:

$$\theta_c = \lambda(Nb/\pi)^{1/2}$$

Where b is the coherent scattering length and N is the number of nuclei per $cm^3$. The best natural material for achieving the highest critical angle for neutron reflection is nickel. The isotope Ni-58 is especially good, having a critical angle of approximately 2.1 milliradians/Å.

In addition to single-layer reflecting materials, multilayer coatings can be produced which rely on Bragg reflection to achieve high reflectivity. These layers are composed of a high-Z material which exhibits large coherent scattering for the radiation being reflected, with an alternating low-Z material that functions as a spacer. In the case of x-rays, the most common high-Z materials are tungsten or molybdenum, while the low-Z spacer is usually silicon, carbon, or beryllium. In the case of neutron reflection, these multilayer coatings are often referred to as "supermirrors." Neutron Supermirrors differ from standard x-ray multilayers in that the d-spacing of the layers is not constant, but increases for the layers towards the surface of the mirror. Supermirror structures are generally composed of layers of nickel or a nickel alloy, with spacer layers of titanium.

Reflective x-ray optics can be classified into several different categories. One class of optics uses grazing reflection from extended mirror surfaces. The most common mirror arrangements have an ellipsoidal or toroidal surface figure for two dimensional focusing of radiation. Another common geometry uses two spherical mirrors oriented sequentially in the vertical and horizontal planes, in an arrangement known as a Kirkpatrick-Baez configuration. An absolute requirement for all reflective x-ray optics is the need to have exceedingly smooth reflecting surfaces due to the small wavelength of the radiation. In general, the surface roughness should be better than 1 nanometer rms.

A different approach for reflective x-ray optics uses the ability of fine glass capillaries to act as reflective guide tubes for x-rays, in a similar manner to fiber optics. Several different configurations of these capillary optics exist. One type of optic, sometimes known as a "Khomakhov Lens", uses a number of discreet curved glass-capillary tubes which are precisely mounted in a frame which independently holds each capillary's curved position along the device. In some optics, each carefully positioned capillary fiber is actually a bundle of many much smaller capillary tubes. X-rays are guided through each capillary by multiple reflections along the outer arc of the capillary tube's interior surface. This mode of reflection is sometimes referred to as a "Whispering Gallery". With such optics, the divergent radiation from an x-ray tube's focal spot can be redirected into either a collimated beam, or condensed back to a small spot a significant distance from the source. This type of optic is not capable of producing spots smaller than approximately 500 microns; the diameter of each fiber. This type of optic is sometimes referred to as a "multifiber optic."

A different type of multicapillary optic uses a single multicapillary bundle which is drawn at elevated temperature so as to have a taper on one or both ends. This type of optic is sometimes referred to as a "monolithic optic." Unlike the multifiber optic, the individual glass channels do not have a constant diameter along their length. This type of optic functions in a similar manner to the multifiber type of optic, but has certain properties which are advantageous in some applications. The smallest spot sizes achievable with this type of optic are approximately 20 microns or larger, while quasi-parallel beam sizes are generally several mm in diameter. Both types of multicapillary optics possess the very attractive ability to collect a large solid angle of radiation emitted from the source. Their main disadvantage is their relatively high cost, and their inability to form very small focused or collimated beams. Both the multifiber and the monolithic optics can also be used as bending optics by curving the capillary bundle. It is possible for a single optic to have a bending section and a focusing section.

Both the monolithic and the multifiber optics are manufactured and sold by X-ray Optical Systems which is located in Albany, N.Y. This company holds a number of patents regarding this technology.

In addition to the previously described capillary optics having multiple channels, a single tapered-capillary may be used effectively to collimate or focus radiation. This tapered monocapillary optic has achieved the smallest spot sizes of any type of x-ray optical device. Their most dramatic use has been with synchrotron radiation where the almost parallel input beam can be condensed to sizes well below 1 micron (≈0.05 microns has been achieved). It is worth noting that tapered monocapillary optics can function in two different focusing modes. In one case, the capillary acts as a true focusing lens, with each photon undergoing a single bounce. In this case, a focal spot is produced some distance beyond the capillary exit. In a different type of capillary optic, photons undergo multiple bounces on their way to the exit and the smallest beam diameter is found directly at the exit aperture. This type of optic is often referred to as a capillary condenser, to draw the distinction from a true lens. The smallest beams have been produced by the condenser type optics, although the small working distance from the exit aperture can be a disadvantage.

The monocapillary type of optic is usually produced by heating and drawing a length of glass capillary tubing to a smaller diameter. There has been some progress in forming glass capillaries with paraboloidal or ellipsoidal shapes, but the slope errors and straightness of the capillary shapes have been difficult to reliably reproduce. It has also not been feasible to coat the inside of these very small capillaries with a different material to enhance the reflectivity. In addition to the standard monocapillary optics produced by this method, a different method has been devised to produce metal reflective tubes by a replicating process on a removable mandrel. The optics produced by these replication methods fall into a category somewhere between standard reflecting optics and true capillary optics, due to their larger bore size. The smallest dimensions of their bores are generally near 0.5–1 mm.

U.S. Pat. No. 5,772,903 (1998) entitled TAPERED CAPILLARY OPTICS describes a different technique to produce tapered monocapillary optics which have significant advantages over the tapered glass capillaries. That patent describes a method to produce a capillary structure having a well controlled taper profile, a high degree of straightness, an extremely smooth internal reflecting surface, and wide latitude in the selection of materials for the internal bore. The extremely small dimensions (1 micron) achievable by the methods delineated in that patent are unique for non-glass capillaries.

This invention relates to the use of a collection of tapered monocapillary optical elements produced by methods described in U.S. Pat. No. 5,772,903, which are bundled together to produce a new type of monolithic polycapillary lens. In this patent, a process to produce many identical tapered monocapillary elements, as well as methods to assemble them accurately to produce the polycapillary structure are disclosed.

The advantage of this type of optic, in comparison to standard glass polycapillary optics will be elucidated from the descriptions that follow. These advantages are a consequence of the fabrication methods, and are the following:

1) It is possible to reproducibly generate almost any desired shape for the individual capillary channels on demand.
2) The process permits wide latitude in the selection of materials of the capillary bores for optimizing the reflectivity of the radiation being used. This can even include multilayer coatings.
3) A highly absorbing material can surround the reflecting layer which minimizes scattered-radiation background.
4) The manufacturing process does not rely on drawing the capillary materials at elevated temperatures which can be difficult to control, and often introduces deformation.

SUMMARY OF THE INVENTION

A plurality of glass or metal wires are precisely etched to form the desired shape of the individual channels of the final polycapillary optic. This shape may be conical, paraboloidal, ellipsoidal, or some other shape. This shape is created by carefully controlling the withdrawal speed of a group of wires from an etchant bath. In the case of complete ellipsoidal capillary channels, the etching operation is performed twice in opposite directions on adjacent wire segments. The etched wires undergo a subsequent operation to create an extremely smooth surface. This surface is coated with a layer of material which is selected to maximize the reflectivity of the radiation being used. This reflective surface may be a single layer of material, or a multilayer coating for optimizing the reflectivity in a narrower wavelength interval. The collection of individual wires is assembled into a close-packed multi-wire bundle, and the wires are bonded together in a manner which preserves the close-pack configuration, irrespective of the local wire diameter. The initial wires are then removed by either a chemical etching procedure or mechanical force. In the case of chemical etching, the bundle is generally segmented by cutting a series of etching slots. Prior to removing the wire, the capillary array is typically bonded to a support substrate. The result of the process is a bundle of precisely oriented radiation-reflecting hollow channels. The capillary optic is used for efficiently collecting and redirecting the radiation from a source of radiation which could be the anode of an x-ray tube, a plasma source, the fluorescent radiation from an electron microprobe, a synchrotron radiation source, a reactor or spallation source of neutrons, or some other source.

BRIEF DESCRIPTION OF THE DRAWINGS

FIG. 2 illustrates a group of previously etched, smoothed, and coated mandrel wire after being placed individually into a uniformly-spaced hexagonal grid of holes in a mounting plate. A second hexagonal grid is used to keep the wires straight and untangled.

DESCRIPTION OF THE SPECIFIC EMBODIMENTS

Figure 1:
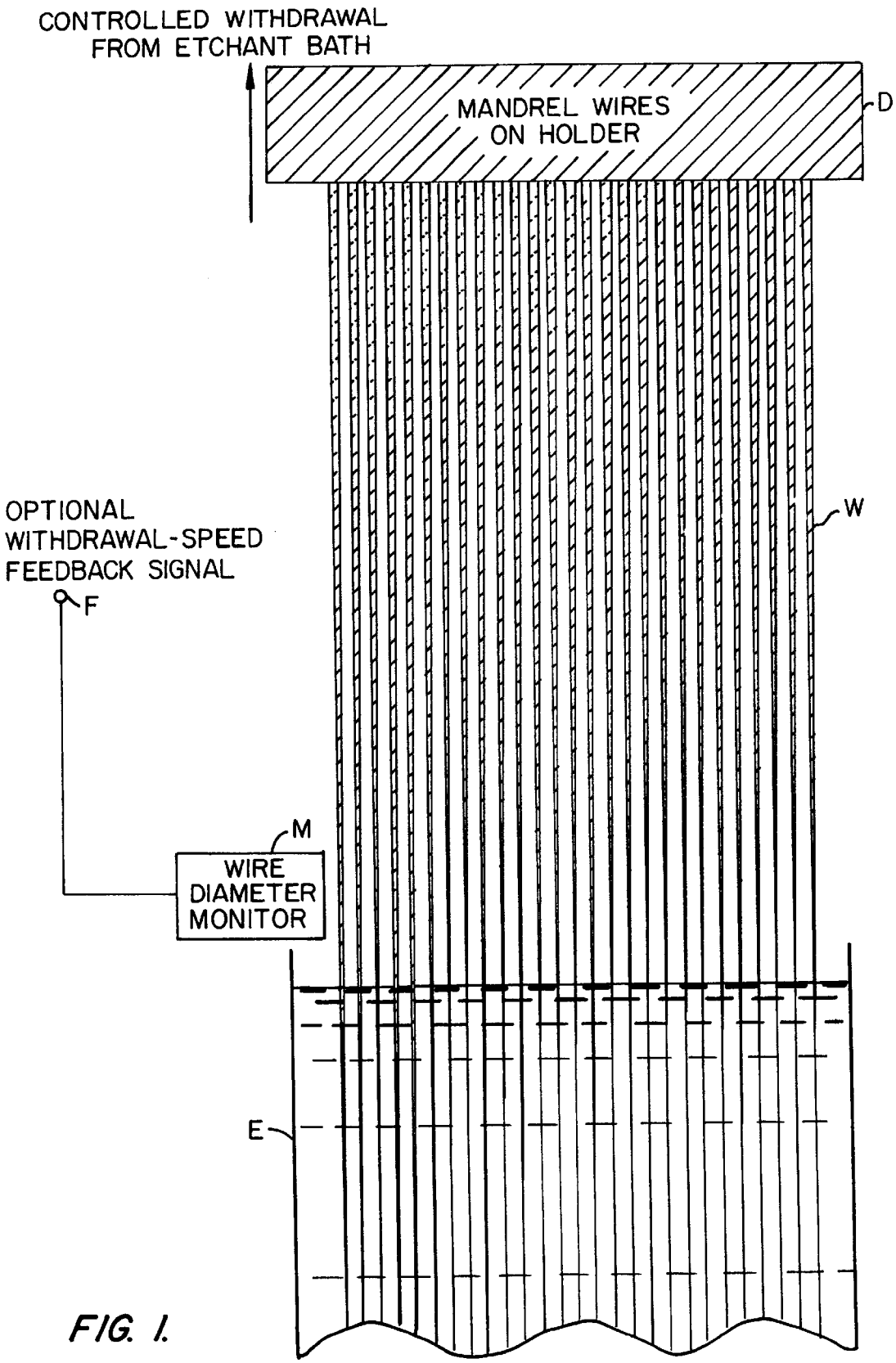
FIG. 1 illustrates a batch of mandrel wires being etched into a desired shape.

U.S. Pat. No. 5,772,903 previously described a fabrication technique for creating tapered monocapillary optics. That patent disclosed a method for creating capillaries with the desired taper profiles on demand which could include paraboloidal, ellipsoidal, conical, or other figures. It is also possible to have a combination of different taper shapes on a single wire, such as a linearly-tapered section followed by a paraboloidal or ellipsoidal taper. The basic capillary formation process described in that patent is the following: A metal or glass wire is etched with great precision to have a taper with the shape of the desired final capillary-optics bore. By controlling the rate of removal of the wire from an etchant bath, the precisely controlled taper is produced. The wire velocity can be regulated using a closed-loop control system which uses a sensor to measure the wire diameter or slope of the wire as it leaves the etchant for feedback control. The etched wire undergoes a treatment to produce an extremely low surface-roughness. This can be a thermal treatment process, or alternately, coating the wire with a material that has an extremely smooth surface and covers the surface roughness of the as-etched wire. The etched and smoothed wire is coated with the material of choice for optimizing the reflectivity of the radiation being used. This is typically a vacuum deposition process such as sputtering, evaporation, or chemical vapor deposition. Aqueous chemical deposition processes are also possible. The coated wire is generally built up with a material to make it more robust, typically with electroplating or electroless deposition. The wire is vertically oriented and tensioned to be straight during this process. In one embodiment, the wire is removed from the built up structure by heating the assembly to liquefy the smoothing layer and physically pulling it out. In a different embodiment, the wire is dissolved away chemically to leave the hollow internal bore of the final tapered capillary optical element. When removing the wire chemically, it is generally necessary to open a number of slots along the capillary structure to allow the removal of the wire in a reasonable time period. Since the wire functions as a mandrel for subsequent forming operations, we will henceforth refer to it as the "mandrel wire". The capillary is typically mounted to a rigid substrate prior to the removal of the wire.

U.S. Pat. No. 5,772,903 did not describe the generation of capillaries having full or nearly full ellipsoidal cavities, since the mandrel-wire diameter always decreases as it is removed from the etchant bath. An improvement which permits the production of etched mandrel wires having ellipsoidal shapes and a maximum diameter has been devised which does not coincide with the capillary opening. In that embodiment, a half ellipsoid is first formed on the wire, as described by U.S. Pat. No. 5,772,903. The wire is then inverted, the etched section of wire is attached to the withdrawal mechanism, and the wire is again lowered into the etchant bath far enough to submerge all of the unetched wire, but no part the etched section. The etching process is then repeated to form the complete ellipsoidal shape. The completed capillary is produced as previously described. Of course, it is necessary to use chemical dissolution of the wire to form the capillary interior cavity, as it is not possible to physically pull the wire out of the structure with this geometry.

In the embodiments described in this patent, a multitude of wires are etched simultaneously by simply attaching the desired number of wires of the starting material to a wire holder. It is obviously crucial that the initial material is very uniform since all of the wires are withdrawn in unison. Referring to FIG. 1, a set of uniform mandrel wires W is shown attached to a support structure D. The preferred wire material is an etchable glass composition as described in U.S. Pat. No. 5,772,903. The wires are quickly submerged in an etchant bath E prior to being withdrawn. In the original concept of this process, it was believed to be necessary to monitor the wire size with a sensor M, and use this information to control the withdrawal speed by a feedback loop F. It has been found that the etching rate of the wire material is often reproducible enough to etch the wire in an open-loop system, and one can dispense with the need for feedback control. In this type of open-loop system, the expected velocity sequence is calculated from a measurement of the linear etching rate of the wire material. It is convenient to have a computer calculate the expected velocity sequence, and load this data into the motion controller. If there is any non-linearity of the etching rate versus diameter, this can be experimentally measured and corrected for in the program. In some optics, the wires may have a linear conical section, in addition to a paraboloidal, ellipsoidal, or other taper figure. It is also possible that the optimum final optic will have different figured wires at different radial distances from the optic axis. In this case, more than one etch will have to be performed on different sets of wires.

Once the wires are etched, they generally must undergo an operation to create an ultra-smooth surface. As previously described in U.S. Pat. No. 5,772,903, and mentioned above, this can be either a thermal treatment, or the coating of another material which covers the surface roughness and itself has a very smooth surface. This coating material can be applied either in a molten form, or dissolved in an evaporable solvent to form a lacquer. This coating can also function as a release layer for removing the mandrel wire in a later fabrication step. After the smoothing procedure, the radiation reflecting layer is applied. This is most commonly a single layer applied by sputtering, vacuum evaporation, chemical vapor deposition, or some other process. Alternately, a multilayer coating is applied which is selected to maximize the reflectivity of the desired radiation being focused. Multilayer coating will be described below in more detail. Both the smoothing process and the deposition of the reflecting material are performed in a similar manner to that done for single wires when producing a monocapillary optic. Special fixtures can be used to rotate the wires during the deposition to achieve very uniform layers, although this is generally not necessary for single-layer films. One method is to clamp the wires between two flat machined plates which oscillate with respect to each other. With this method, the clamped part of the wires acts as a sort of roller bearing between the plates, and the wires will receive a uniform coating as they rotate in a oscillatory fashion. After the deposition of the reflecting layer, a subsequent reinforcing layer is often desirable which can be applied by electroplating or some other process. This reinforcing layer can also serve the useful function of absorbing radiation which is either not reflected, or is scattered from the capillary surface. This component of the radiation can cause an undesirable background to the experiment. In the case of neutron optics, a good material for an absorbing layer would be cadmium which can be applied by electroplating. The smoothing, and deposition of reflecting and reinforcing materials on the mandrel wires has been previously described in U.S. Pat. No. 5,772,903 for monocapillaries and is not illustrated here.

We have assumed that any reinforcing layer is uniform in thickness and relatively thin in comparison to the wire. It is possible to consider the use of nonuniform reinforcing layers. These could be formed, for instance, by controllably removing the wires during the electroplating step, and thereby create a gradation in thickness. The potential use of such tapered reinforcing layers is to finely adjust the direction of the wires in the subsequently formed wire bundle which will be described next. Nonuniform reinforcing layers also lead to a variation of the open area ratio of the final optic at different places along the optic axis.

The set of etched, smoothed, coated, and possibly reinforced wires are now bundled together. Referring to FIG. 2, the individual wires W are placed one at a time in a holder G which has a hexagonal grid pattern of holes. The walls of the grid are made as thin as possible to maximize the open area of the final optic. Minimizing the wire separation also aids in keeping the wires from crossing over each other in a subsequent bonded step described below. It is desirable to also have at least one additional secondary grid G' near the bottom of the bundle to keep the wires straight and untangled. The holes pattern of the secondary grid or grids G' can be identical to the top grid G, as shown. Alternately, it is possible to use a grid G' having a set of smaller holes with corresponding smaller spacing to more closely match the smaller wire sizes away from the top of the bundle as illustrated. In the case of wires which have a maximum diameter which is not at one end of the wire, the holder G is positioned at some intermediate position along the length of the wires and the secondary grids G' are used on either side.

Figure 3:
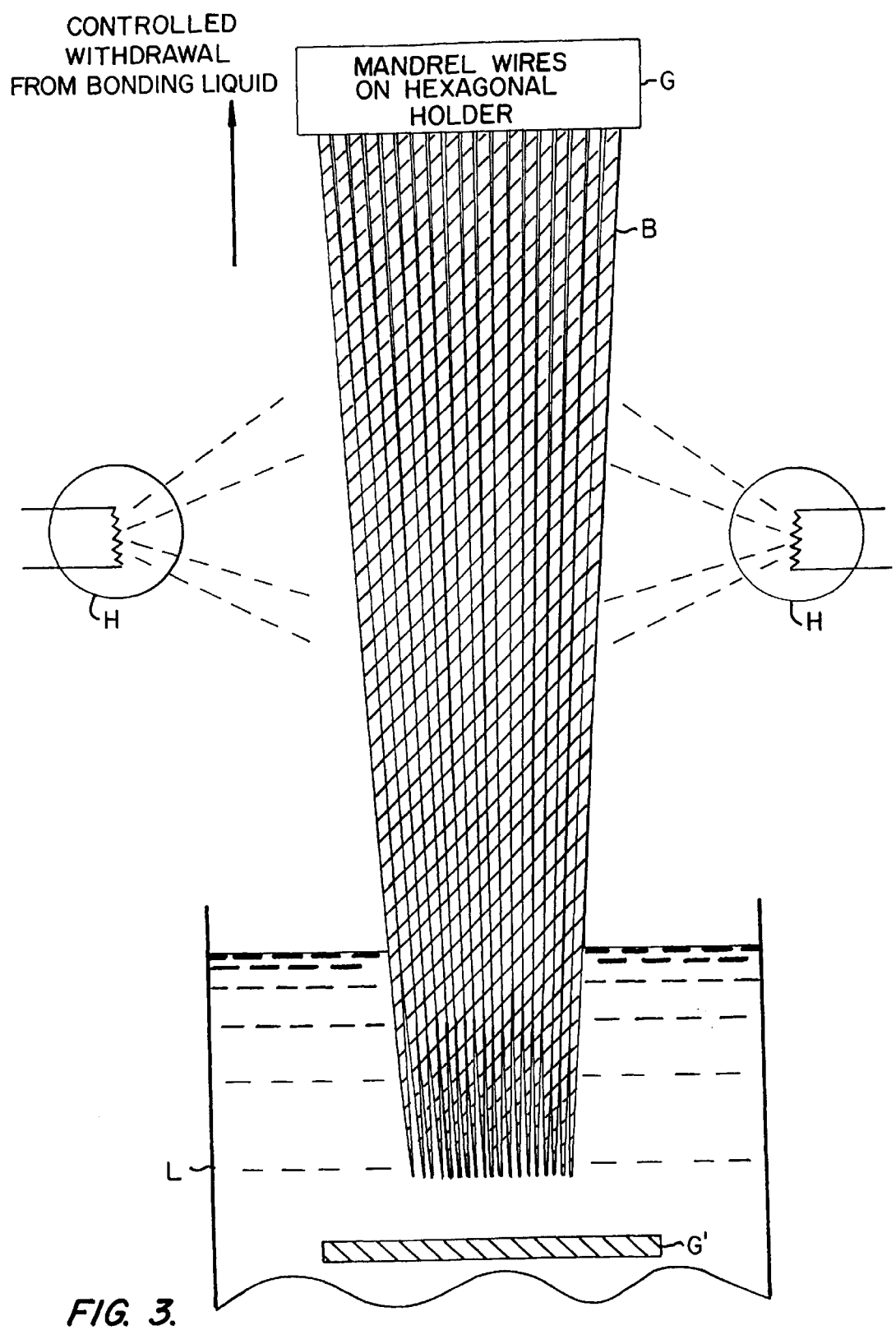
FIG. 3 illustrates the bundle of mandrel wires being withdrawn from a lacquer filled container to create a bonded hexagonal close-packed bundle of wires.

Once the bundle of wires has been formed, it is necessary to form the monolithic tapered structure. Referring to FIG. 3, the wire bundle B with the grid holder G and secondary grid G' is carefully immersed in a container of bonding material L. One embodiment uses a lacquer-like material with an evaporable solvent as the bonding material. As the bundle is removed from the bath and the solvent evaporates, surface tension forces act to squeeze the wires together above the surface. The bundle is slowly removed to assure that the wires keep their close-packed arrangement. Note that the secondary grid G' is held stationary in the bath, so that the wires clear the holes of the grid before leaving the bath. Alternately, the secondary grid may be moved vertically in a motion which is independent from the wire-withdrawal motion. Therefore, its position in the bonding fluid will change as the wires are withdrawn, but not necessarily at the same rate. In general, this motion will stop near the top of the liquid so that the wires clear the grid before leaving the bath, as in the case of a stationary grid. Since the wires start off at the top of the bundle in near contact, there is the desirable tendency for the wires to stay aligned, rather than becoming tangled. To become tangled and disrupt the close-packed arrangement, a wire would need to essentially "jump the groove" formed by the neighboring wires. A heater H may be used to speed the drying process above the surface. For wire bundles with the maximum diameter not on an end, the process is repeated separately for the two sides of the bundle. It should be appreciated that these two sides are not necessarily symmetrical.

There are other potential methods to bond the collection of wires together which differ from the method shown in FIG. 3. One alternate method, not shown here, would be to coat the individual wires with a low melting-point adhesive or alternately, a metal alloy, prior to placing the wires in the holder G. After placing the wires in the holder, fine thread, or some other mechanical means, could be used to carefully tie the wires together in a close-packed arrangement in several places along the bundle. The bundle could then be fused together with a heater which melts or softens the adhesive. There are other methods which could be envisioned to accomplish the task of forming the fused wire bundle. The method shown in FIG. 3 is a practical means to achieve the necessary precise positioning of the wires since it is an essentially self-aligning method. The use of a metal alloy, on the other hand is advantageous if an all-metal structure is desired.

If the wire-bonding agent wets the surface of the wire, it is possible that the wires can be mechanically tied together without any of this bonding material pre-coating them. The liquefied binding material would then fill the interstitial volume between the wire by capillary action and then allowed to solidify. In some cases, this process would be carried out in a vacuum to remove the air which could hinder the filling of the interstitial space.

Figure 4:
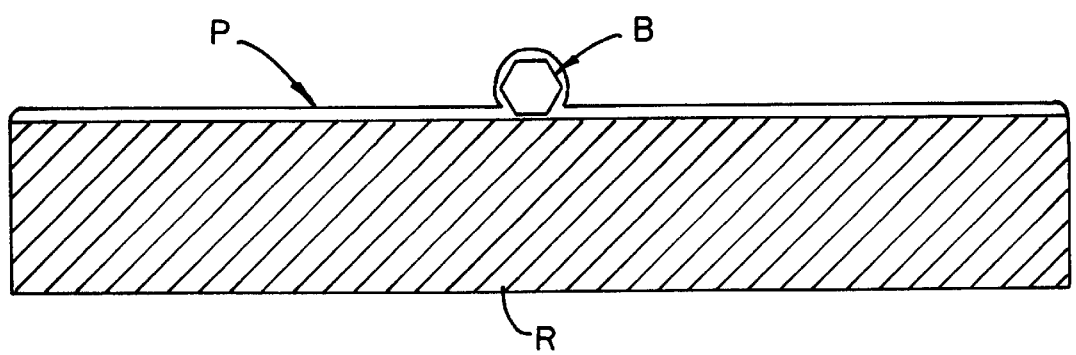
FIG. 4 illustrates the bundle of wires being bonded onto a substrate by electroplating.

After forming the bonded wire-bundle, it is often desirable to reinforce it to make it more rigid and robust. There are two general approaches to reinforcing the capillary structure. In one embodiment a relatively large amount of material is added to the bundle to form a more rigid structure. One convenient method is to use electroplating or electroless deposition to increase the diameter. Encapsulation in a polymer such as epoxy resin is another method. This piece is often subsequently bonded to a flat substrate to make it even more robust, although this is not absolutely required if the reinforcing material is thick and rigid enough. A different embodiment is shown in FIG. 4 which shows a cross section of the optic. Here the bundle B is first mounted directly to a rigid substrate R, either in contact, or held in close proximity directly above the substrate surface. It is desirable to accomplish this step while the bundle is tensioned and vertically oriented to keep it absolutely straight. It is also possible to machine the substrate so that it has a surface figure which matches the bundle shape. In this case, the bundle may lie completely in contact with the surface, but not be curved. After this mounting step, the wire is then essentially buried on the substrate under an electroplated or electroless deposited layer P on both the wire and the substrate. It is often desirable to perform a small amount of plating on the bundle itself before bonding to the substrate for further plating. In any case, some metallization of the lacquer is necessary for subsequent plating. The result of this process is a monolithic structure with superior dimensional properties. For high heat load applications, such as synchrotrons, very high thermal conductivity can be realized by using a substrate of copper or silver, followed by plating with the same material.

The use of electroplating or some other reinforcing process can also serve the function of holding the bundle of wires together in instances where the wires are not strongly bonded to each other. For instance, if the wires are simply tied together with threads as described above, a subsequent electroplated layer surrounding the bundle will act to clamp the wires together in their desired close-pack configuration. This type of arrangement is desirable if it is required to have no organic binding material present, and the use of a low melting-point metal for fusing the bundle together is not practical. A second possibility is to use a binding material that will be removed in a solvent in a subsequent processing step. In this case, the binder is used to hold the wires in place until an electroplated layer is use to jacket the wire bundle. After that, the binder can be dissolved away and the wires will remain in place due to the electroplated material surrounding the bundle.

Figure 5:
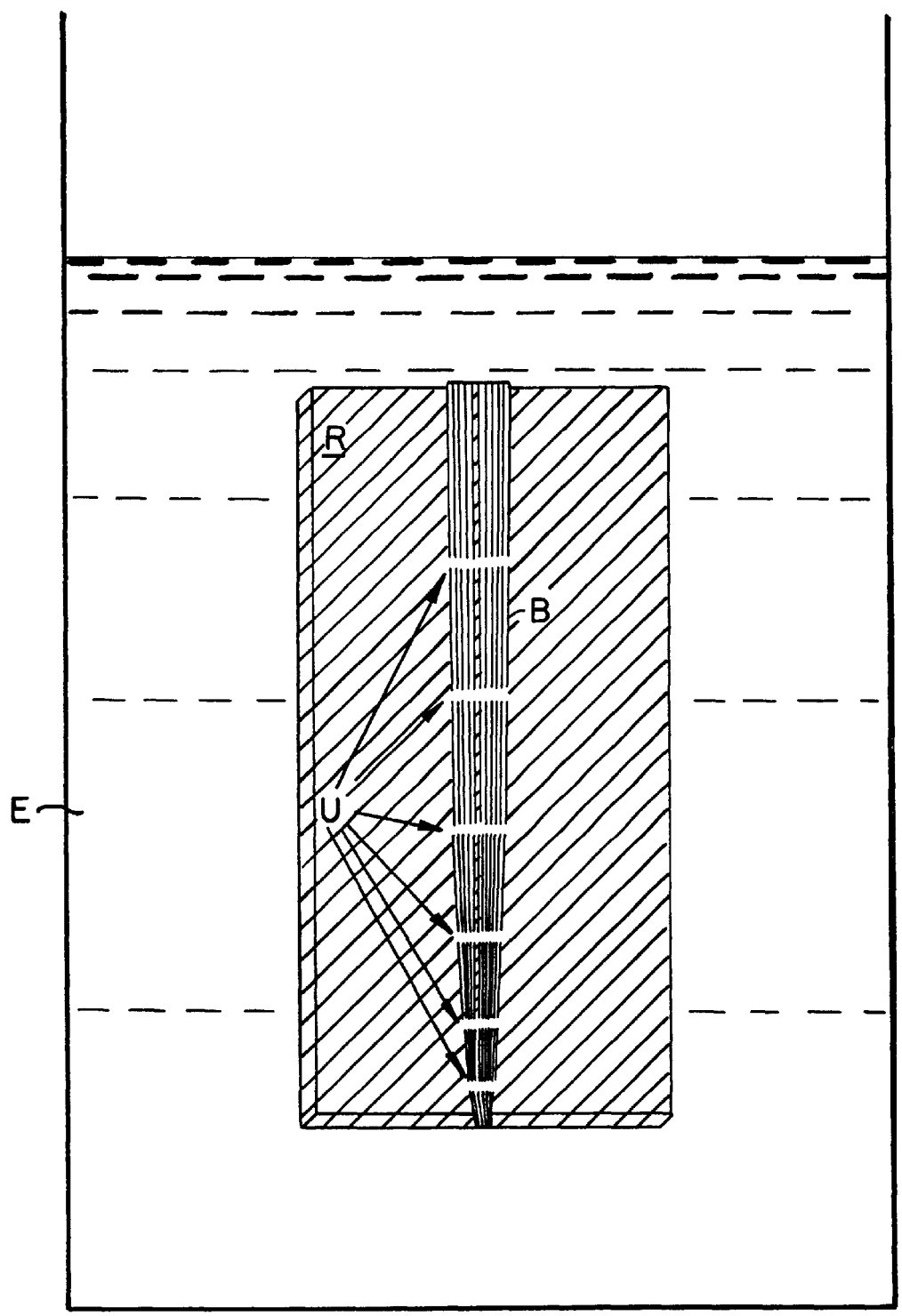
FIG. 5 illustrates a paraboloidal capillary bundle mounted on a substrate, having etching grooves periodically segmenting the bundle, and placed in an etchant bath to remove the capillary cores.

Once the bundle is mounted, the final step in forming the optic is to remove the initial wire material. As described in U.S. Pat. No. 5,772,903 it is possible in some cases to remove the wires by mechanical force. In general, it has been found that the etching process is more practical. In the case of full ellipsoidal shapes, it is of obviously the only way. An especially good way to open up a series of etching grooves for subsequent chemical dissolution is to use a wire saw. One type of wire saw uses a diamond impregnated wire which is much cleaner than using a slurry for the cutting. This type of saw generates negligible distortion to the capillary structure. It is also possible to only cut partially into the mandrel-wire so as to leave most of the capillary bore intact, even at the location of the cut. Referring to FIG. 5, a series of etching grooves U can be seen cut along the capillary bundle B which is mounted on the substrate R. The assembly is placed into an etchant bath E to dissolve the mandrel wire material. The smoothing layer material is then dissolved, and the final optic is carefully washed and dried.

To create a point-to-point focusing bundle, there are several possibilities. One approach is use a bundle with the maximum wire size not coinciding with the end of the bundle. This could be a bundle formed from full ellipsoidal wires. A different approach is to fabricate two converging bundles, and mount them with their large ends butted together. It is important to note that it is often desirable to use a combination of capillary figures on the individual wires. A common example would be linear taper at the ends of the optic, instead of using pure ellipsoidal-shaped channels. It is also possible to accomplish a point-to-point focusing arrangement by using two adjoined paraboloidal-wire bundles. Neither of these adjoined optics is as desirable as a single monolithic capillary because of the need to assure that the capillary channels are exactly the same and perfectly aligned at the junction.

A point source can also be used to produce a quasi-collimated beam. With a monocapillary device, this is most conveniently achieved with a paraboloidal figure. With the bundled device being described here, a collection of paraboloidal wires would be a possibility. As in the previous example, a combination of capillary figures would often be advantageous. For instance, the small wire ends could have a linear tapers, followed by a paraboloidal shape. The large end of the optic might end with a section of non-tapered capillary channels to form the collimated output beam.

For maximizing the performance level of a capillary optic, the material comprising the bore of the capillary should be selected to have the highest reflectivity and the highest critical angle. These two aims are sometimes in conflict as the highest critical angle materials for x-rays are high density materials which are generally not as reflective as the lower density materials which have lower critical angles. For a one-bounce type of optic, the increase in critical angle of a high density material will, in general, more than offset its lower reflectivity. For multiple-bounce optics, this may not be the case. A full analysis needs to be performed on each particular capillary shape and energy range.

All of the preceding assumes a single layer of reflecting film on the capillary bore. There is a different type of reflecting layer which is a multilayer coating. This is a layer of generally two different materials: a high-Z scattering layer, and a low-Z spacer. These materials function as large d-spacing synthetic crystals which reflect according to Bragg's Law. From Bragg's Law, a strong reflection occurs when the following condition occurs:

$$\lambda = 2d \sin \theta$$

Multilayer coatings are usually applied by vacuum deposition from two sources. Since the angle of incidence for radiation is not constant for a capillary channels that are in different radial distances from the bundle center and thus have different curvatures, Bragg's Law is not strictly observed for a single wavelength along the whole optic. It is possible to compensate for this by having multilayer coatings with a varying d-spacing for different wires. Alternately, the bandwidth of the source, as well as the multilayer bandwidth, may be large enough due the rather small range of incidence angles in these capillaries.

Figure 6:
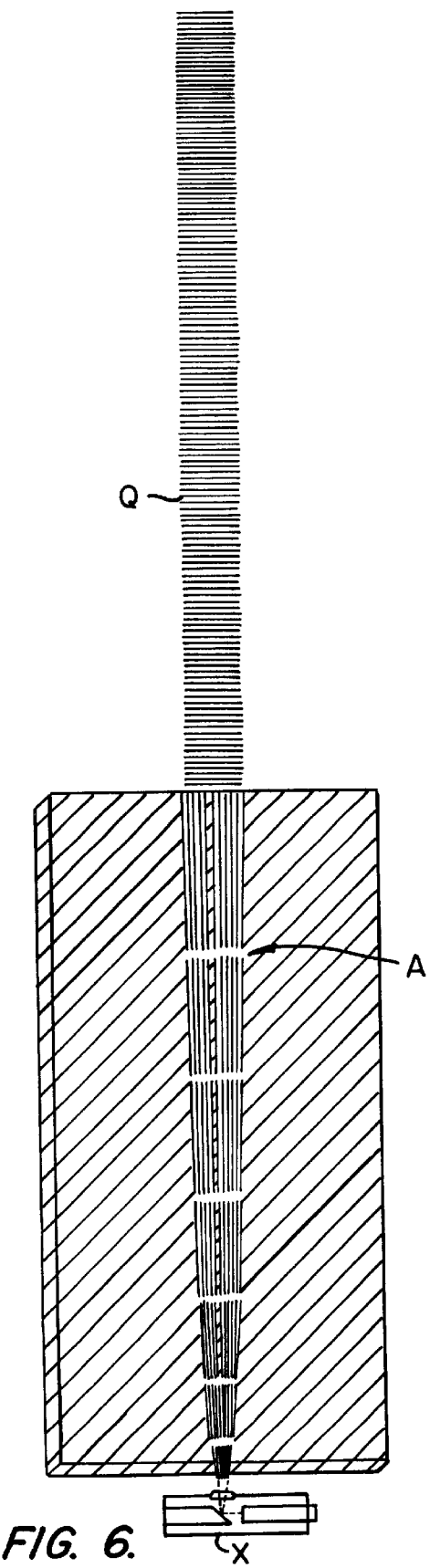
FIG. 6 illustrates a paraboloidal capillary bundle being used with an x-ray tube source.

There are a number of different radiation sources which may be used with these optical elements. Referring to FIG. 6, a paraboloidal capillary A is shown being used with an x-ray tube X. In this geometry, a quasi-parallel beam Q of radiation is produced by redirecting the divergent radiation emitted from the source.

Figure 7:
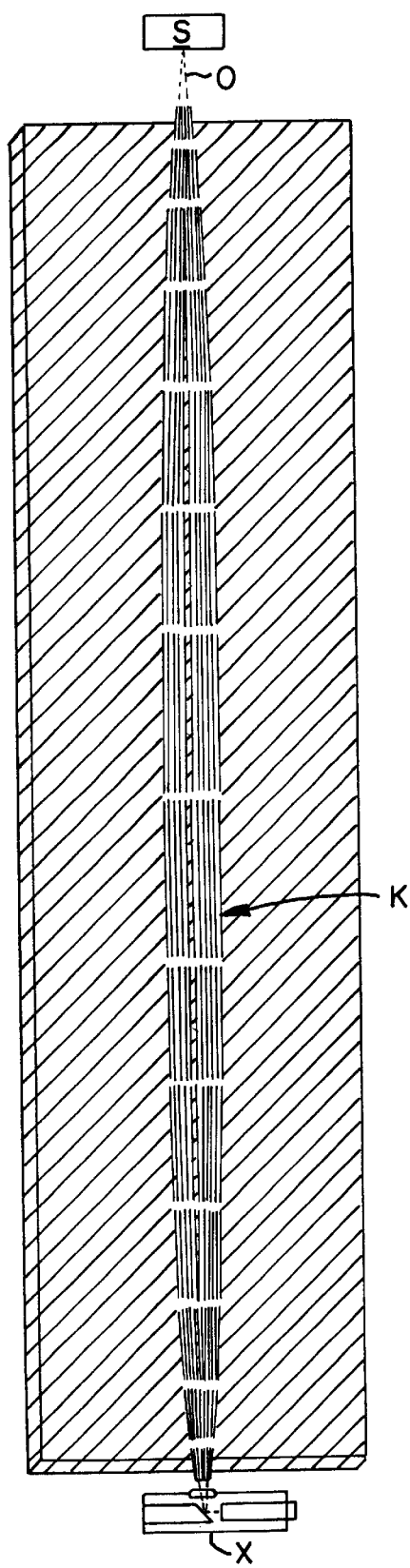
FIG. 7 illustrates an full ellipsoidal capillary bundle being used with an x-ray tube source.

Referring to FIG. 7, a full ellipsoidal capillary optic K is shown being used with an x-ray tube X. In this geometry, the source is located at one foci of the bundle, and a focused spot O is formed at the other foci. A sample S is located at the focus for analysis. The two source and optics arrangements shown in FIGS. 6 and 7 are very desirable for performing experiments in small laboratories. X-ray fluorescence from a small volumes of material using ellipsoidal capillaries is one important application. X-ray diffraction, using either ellipsoidal or paraboloidal capillaries is another very useful application of this technology. It should be remembered that the terms ellipsoidal and paraboloidal do not exclude the possibility of parts of the capillary channels having different tapers such as linear, or no taper at all. These terms are really meant only to indicate that a point source radiator will be directed into a collimated beam (paraboloidal) or a focused spot (ellipsoidal).

When selecting an x-ray tube to use with these optics, it is desirable to use the brightest possible source. It is well known that the maximum power loading that an x-ray tube can dissipate is approximately proportional to the spot size. Thus, the brightest x-ray tubes are microfocus sources, since the power per unit area is highest. Of course, the total flux is not as high, but this is not the important parameter for this application. These microfocus sources have the advantage of smaller size, lower power requirements, and lower cost compared to high power rotating anode sources.

Figure 8:
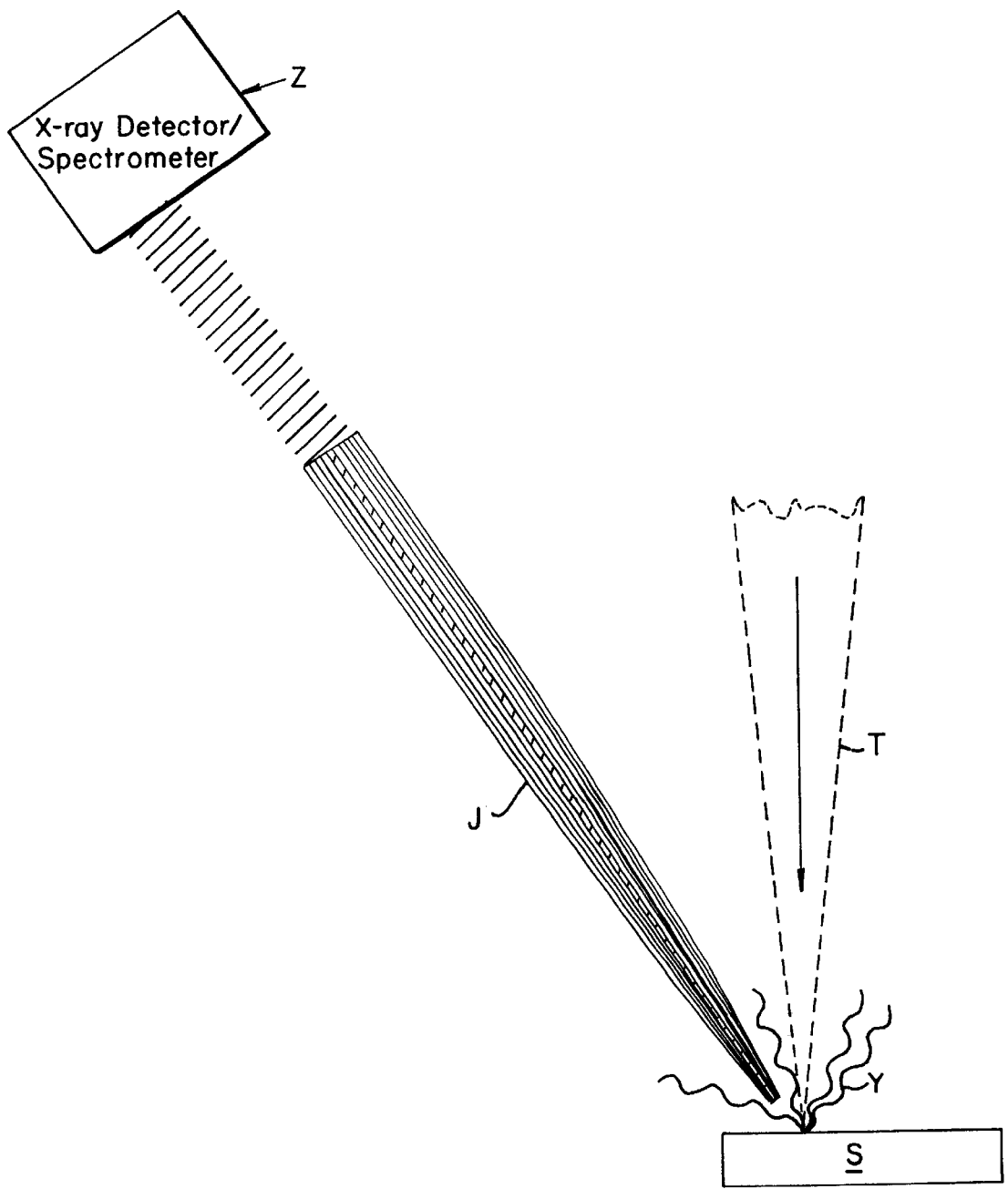
FIG. 8 illustrates a paraboloidal capillary bundle collecting and focusing neutrons from a guide tube of a neutron source.

A different application of these optics involves collecting the x-rays emitted from a small volume of material on a specimen in an electron microprobe instrument. This arrangement is fundamentally no different than the use with a microfocus tube. Referring to FIG. 8, an extremely small electron beam T of an electron microprobe is directed at specific locations on a specimen S. This generates fluorescent x-rays Y which are emitted from the impact point. A capillary optic J collects this radiation, and directs it to a detector Z which measures the spectral distribution of the radiation for determining the elemental content of the sample. Depending on the type of detector arrangement, the optic could be a point-to-point focusing device, or an optic which forms a parallel beam.

A different type of radiation source generates short wavelength photons by emission from a very hot plasma. There are several different ways to generate the plasma, but the most common type uses a focused laser beam to heat a target material to an extremely high temperatures. The x-rays from the small plasma volume are collected and redirected as before by the capillary optic. One complication for this type of source is the need to keep debris from the expanding plasma from contaminating the optics. A number of methods have been devised for this. This type of source is especially useful for the generation of soft x-rays where electron impact sources are extremely inefficient.

Figure 9:
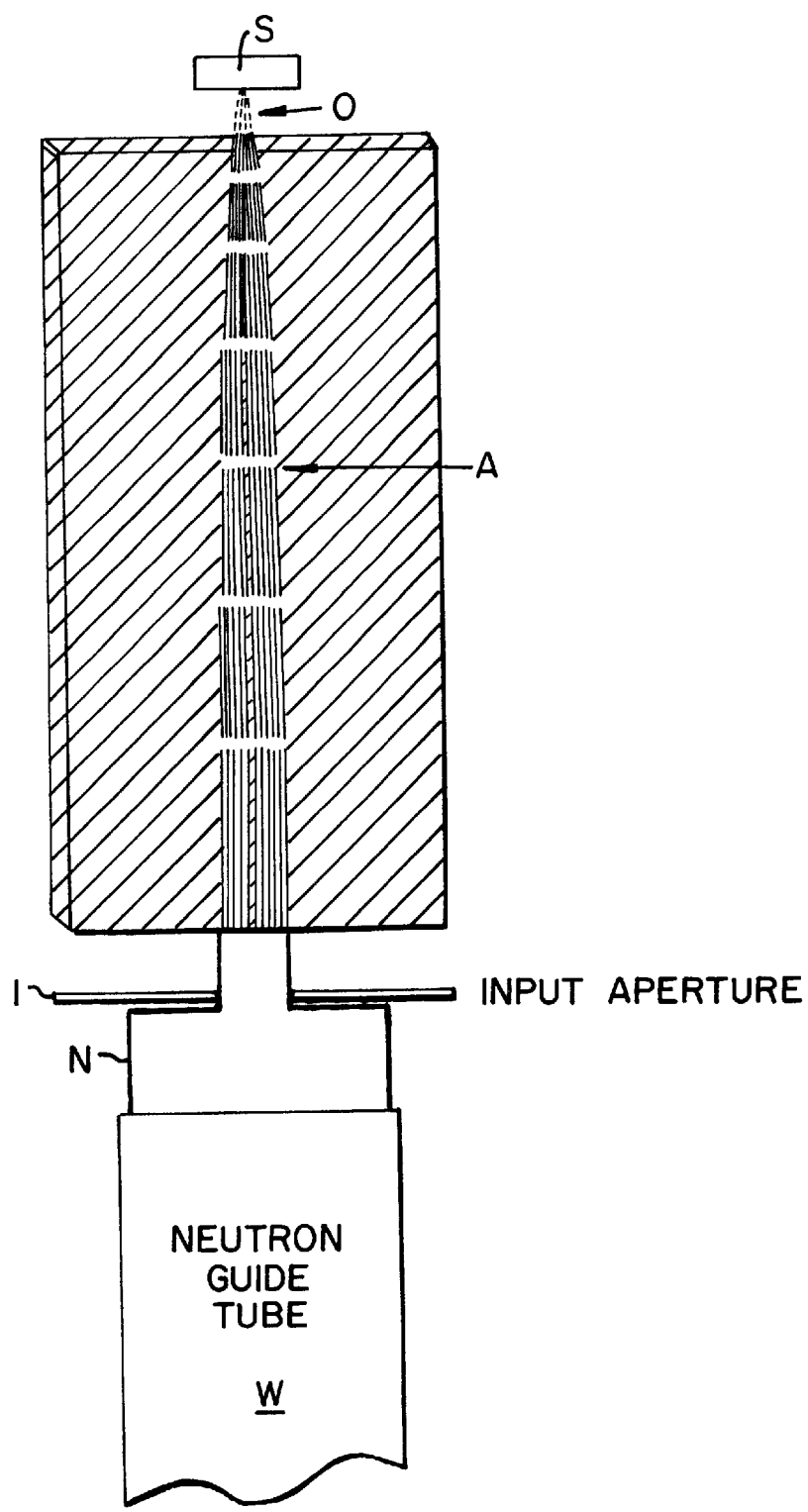
FIG. 9 illustrates bundled monocapillary optics for use with neutrons.

These optics are very suitable for use with beams of thermal or cold neutrons. Referring to FIG. 9, a beam of neutrons N emerges from a guide tube W of a reactor or spallation source. The beam is collimated with an aperture I which matches the size of the non-tapered input-face of a focusing capillary bundle A. Neutrons are guides through the bundle and form a focused beam O of neutrons which impact a specimen S. This arrangement can be used for prompt-gamma activation analysis or neutron depth profiling, with high spatial resolution. Neutron diffraction is another possible application. Nickel or the isotope Ni-58 are the best single layer materials for maximizing the critical angle. Supermirror coatings are also possible, as previously described. An additional outer layer of cadmium or another element having a large neutron absorption cross-section is desirable for absorbing the scattered or unreflected neutrons. The beam emerging from the neutron guide on FIG. 9 has a divergence corresponding to the critical angle of the neutron guide's interior surface. There are other potential experimental geometries where a much more divergent beam would originate from a smaller area. In this case, a capillary optic would be used having a tapered input face.

Finally, we point out that these optics can also be used as bending elements for the radiation being used. This is accomplished by simply curving the bundle of wires before they are bonded together. In the case of a focusing optic, this is most conveniently accomplished by having a section of non-tapered mandrel-wires before the tapered section. The bending is done only over the section of the final optic which is non-tapered. This type of optic is very useful in the case of neutrons where there is often a high flux of fast neutrons and gamma rays which are difficult to shield from the experiment. The bend of the optic can remove the focal area of the optic from direct line of sight of this penetrating radiation.

What is claimed is:

1. A process for producing an array of tapered capillary optics for focusing radiation comprising the steps of:

providing an etchant bath;

providing a uniform array of wires to be etched;

placing the uniform array of wires into the etchant bath to a preselected depth for etching;

withdrawing the uniform array of wires from the preselected depth at a controlled rate to form a differential etch to form a uniform array of tapered wires with substantially identical desired tapers having a desired taper profile of the tapered array of capillary optics;

coating the uniform array of wires to produce a coated uniform array of wires with each wire having a coating reflective of the radiation to be focused by the array of capillary optics;

bundling the uniform array of wires to provide a bundled coated uniform array of wires; and, removing the uniform array of tapered wires from the coated uniform bundled array of wires to leave only an array of substantially uniform coated bores having the substantially identical desired tapers for focussing radiation.

2. The process for producing an array of tapered capillary optics for focusing radiation according to claim 1 and wherein:

the coating step occurs before the bundling step.

3. The process for producing an array of tapered capillary optics for focusing radiation according to claim 1 and wherein:

the bundling step includes placing a binding material around the coated uniform array of wires; and, allowing the binding material to bind the array into the bundle.

4. The process for producing an array of tapered capillary optics for focusing radiation according to claim 1 and wherein:

the bundling step includes, providing a binding bath having fluid with surface tension;

dipping the tapered wires in the binding bath;

drawing the tapered wires from the binding bath; and, allowing surface tension from the binding bath to draw the wires into a bundle.

5. The process for producing an array of tapered capillary optics for focusing radiation according to claim 1 and wherein:

the bundling step includes:

wetting the surface between the wires with a fluid having surface tension and drawing the wires together utilizing the fluid having surface tension.

6. The process for producing an array of tapered capillary optics for focusing radiation according to claim 1 and wherein:

reinforcing the coated uniform array of tapered.

7. The process for producing an array of tapered capillary optics for focusing radiation according to claim 1 and wherein:

reinforcing the coated uniform array of tapered wires occurs before the bundling step.

8. The process for producing an array of tapered capillary optics for focusing radiation according to claim 1 and wherein:

reinforcing the coated uniform array of tapered wires occurs after the bundling step.

9. The process for producing an array of tapered capillary optics for focusing radiation according to claim 6 and wherein:

the reinforcing step includes encapsulation in a polymer.

10. The process for producing an array of tapered capillary optics for focusing radiation according to claim 6 and wherein:

the reinforcing step includes electroplating.

11. The process for producing an array of tapered capillary optics for focusing radiation according to claim 6 and wherein:

the reinforcing step includes electroless deposition.

12. The process for producing an array of tapered capillary optics for focusing radiation according to claim 1 and wherein:

the step of removing the array of tapered wires includes cutting through the coated wires; and, etching the wires from inside the coating.

13. The process for producing an array of tapered capillary optics for focusing radiation according to claim 1 and wherein:

the step of coating the uniform array of wires includes depositing a multilayer coating on the wires.

14. The process for producing an array of tapered capillary optics for focusing radiation according to claim 1 and wherein:

bending the bundled coated uniform array of wires whereby the array of substantially uniform coated bores is similarly bent.

15. The process for producing an array of tapered capillary optics for focusing radiation according to claim 1 and wherein:

withdrawing the uniform array of wires from the preselected depth at a controlled rate to form a differential etch with each etch being ellipsoidal.

16. The process for producing an array of tapered capillary optics for focusing radiation according to claim 1 and wherein:

withdrawing the uniform array of wires from the preselected depth at a controlled rate to form a differential etch with each etch being parabolidal.

17. The process for producing an array of tapered capillary optics for focusing radiation according to claim 1 and wherein:

withdrawing the uniform array of wires from the preselected depth at a controlled rate to form a differential etch with each etch being conical.

18. The product of the process of claim 1.

19. A process for producing a tapered array of capillary optics for focusing radiation comprising the steps of:

providing an etchant bath;

providing a uniform array of wires to be etched;

placing a first uniform array of wires into the etchant bath to a preselected depth for etching;

withdrawing the first uniform array of wires from the preselected depth at a controlled rate to form a differential etch to form a uniform array of first tapered wires with substantially identical desired tapers having a desired taper profile of the tapered array of capillary optics;

placing a second uniform array of wires into the etchant bath to a preselected depth for etching;

withdrawing the second uniform array of wires from the preselected depth at a controlled rate to form a differential etch to form a uniform array of second tapered wires with substantially identical desired tapers having a desired taper profile of the tapered array of capillary optics, the second uniform array of wires having profiles differing from the first uniform array of wires;

coating the first and second uniform array of wires to produce a coated uniform array of wires with each wire having a coating reflective of the radiation to be focused by the array of capillary optics;

bundling the first and second uniform array of wires to provide a bundled coated uniform array of wires; and, removing the first and second uniform array of tapered wires from the coated uniform bundled array of wires to leave only a first and second array of substantially uniform coated bores having the substantially identical desired tapers for focussing radiation.

* * * * *